US012183484B2

(12) United States Patent
Farkas et al.

(10) Patent No.: US 12,183,484 B2
(45) Date of Patent: Dec. 31, 2024

(54) CONTROLLED CABLE ATTENUATION

(71) Applicant: DELL PRODUCTS L.P., Round Rock, TX (US)

(72) Inventors: Sandor Farkas, Round Rock, TX (US); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 333 days.

(21) Appl. No.: 17/727,754

(22) Filed: Apr. 24, 2022

(65) Prior Publication Data

US 2023/0343487 A1 Oct. 26, 2023

(51) Int. Cl.
*H01B 7/30* (2006.01)
*H01B 11/18* (2006.01)

(52) U.S. Cl.
CPC ............... *H01B 7/30* (2013.01); *H01B 11/18* (2013.01)

(58) Field of Classification Search
CPC .................................. H01B 7/30; H01B 11/18
See application file for complete search history.

(56) References Cited

U.S. PATENT DOCUMENTS

| | | | | |
|---|---|---|---|---|
| 10,368,437 | B2 | 7/2019 | Farkas et al. | |
| 10,950,369 | B1 | 3/2021 | Farkas et al. | |
| 11,102,878 | B1 | 8/2021 | Chandra | |
| 2014/0209347 | A1* | 7/2014 | Buck | H01B 11/1821 427/118 |
| 2018/0090243 | A1 | 3/2018 | Farkas et al. | |
| 2018/0108966 | A1* | 4/2018 | Lee | H01Q 13/08 |
| 2019/0109419 | A1* | 4/2019 | Garcia | H01R 24/40 |
| 2020/0012182 | A1* | 1/2020 | Warren | E03F 9/007 |
| 2021/0398713 | A1* | 12/2021 | Huang | H01B 11/1843 |

* cited by examiner

*Primary Examiner* — Hoa C Nguyen
*Assistant Examiner* — Amol H Patel
(74) *Attorney, Agent, or Firm* — Larson Newman, LLP

(57) ABSTRACT

A cable comprising a conductor in a center of the cable, a dielectric layer surrounding the conductor and a resistive coating may be provided. The resistive coating may be applied to an exposed portion of the conductor and disposed with the dielectric layer. The resistance of the resistive coating when combined with an impedance of the cable prior to application of the resistive coating reaches a target impedance.

20 Claims, 5 Drawing Sheets

100

300

400

Legend:

Cable 1 100 mm ————
Cable 2 300 mm – – – –
Cable 3 500 mm —— – –
Cable 4 700 mm ···········

CONTROLLED CABLE ATTENUATION

FIELD OF THE DISCLOSURE

This disclosure generally relates to information handling systems, and more particularly relates to controlled cable attenuation.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Electrical cables (or simply cables) have become an integral part of many information handling systems such as, desktop computers, laptop computers, and servers. Cables may be used externally to connect multiple information handling systems together, or internally to connect various components together such as printed circuit boards (PCBs) within an information handling system. When one or more servers are installed within a rack, for example, communication between the servers can be easily accomplished through externally coupled cables. Internal cables are also commonly used within the servers for connecting Serial Attached Small Computer System Interface (SCSI), Serial Attached SCSI (SAS), Serial Advanced Technology Attachment (SATA) and non-volatile memory (NVME) backplanes.

Cables are commonly used in high-speed signal transmission applications, because they provide a low cable loss for signal propagation. However, with signal speeds steadily increasing, lowering the cable loss is becoming a major design challenge for future high-speed signal transmission applications. Even though cables provide a lower cable loss than other mediums, the loss through the cables may not be adequate to meet the channel budget specified in some high-speed data bus standards, such as the Peripheral Component Interconnect Express (PCIe) standard, at certain cable lengths (e.g., cable lengths greater than 700 mm). While ultra-loss materials are currently being considered, there is an ever present need to design cables with lower cable loss.

SUMMARY

A cable comprising a conductor in a center of the cable, a dielectric layer surrounding the conductor and a resistive coating may be provided. The resistive coating may be applied to an exposed portion of the conductor and disposed with the dielectric layer. The resistance of the resistive coating when combined with an impedance of the cable prior to application of the resistive coating reaches a target impedance.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

A coaxial cable (or simple "coax") is one type of electrical cable commonly used for high-speed signal transmission. As known in the art, a coaxial cable typically includes a center conductor, an insulating dielectric layer surrounding the center conductor, and an outer conductor surrounding the insulating dielectric layer, all of which is surrounded by a protective outer jacket. In a coaxial cable, the center conductor is used for single-ended signal transmission, while the outer conductor (or shield) is connected to ground.

Figure 1A:
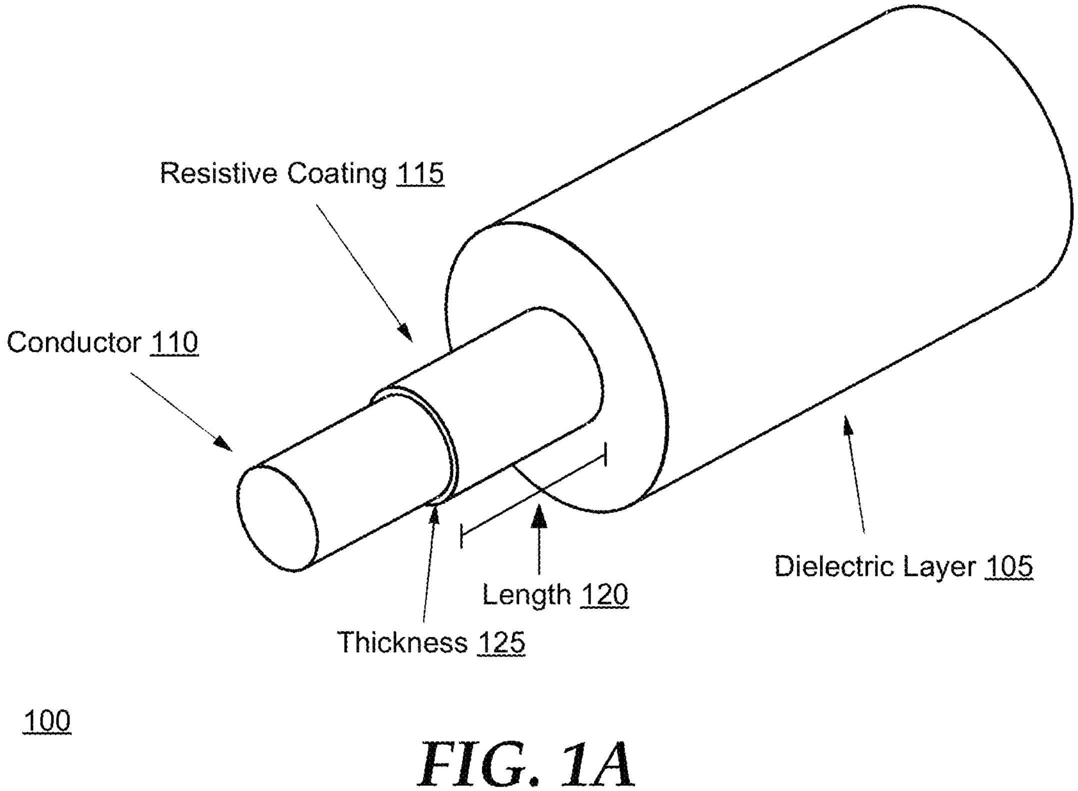
FIGS. 1A, 1B, and 2 illustrate a perspective diagram of a cable with a resistive layer for implementing controlled cable attenuation and the cable soldered to a printed circuit board, according to an embodiment of the current disclosure.
Figure 2:
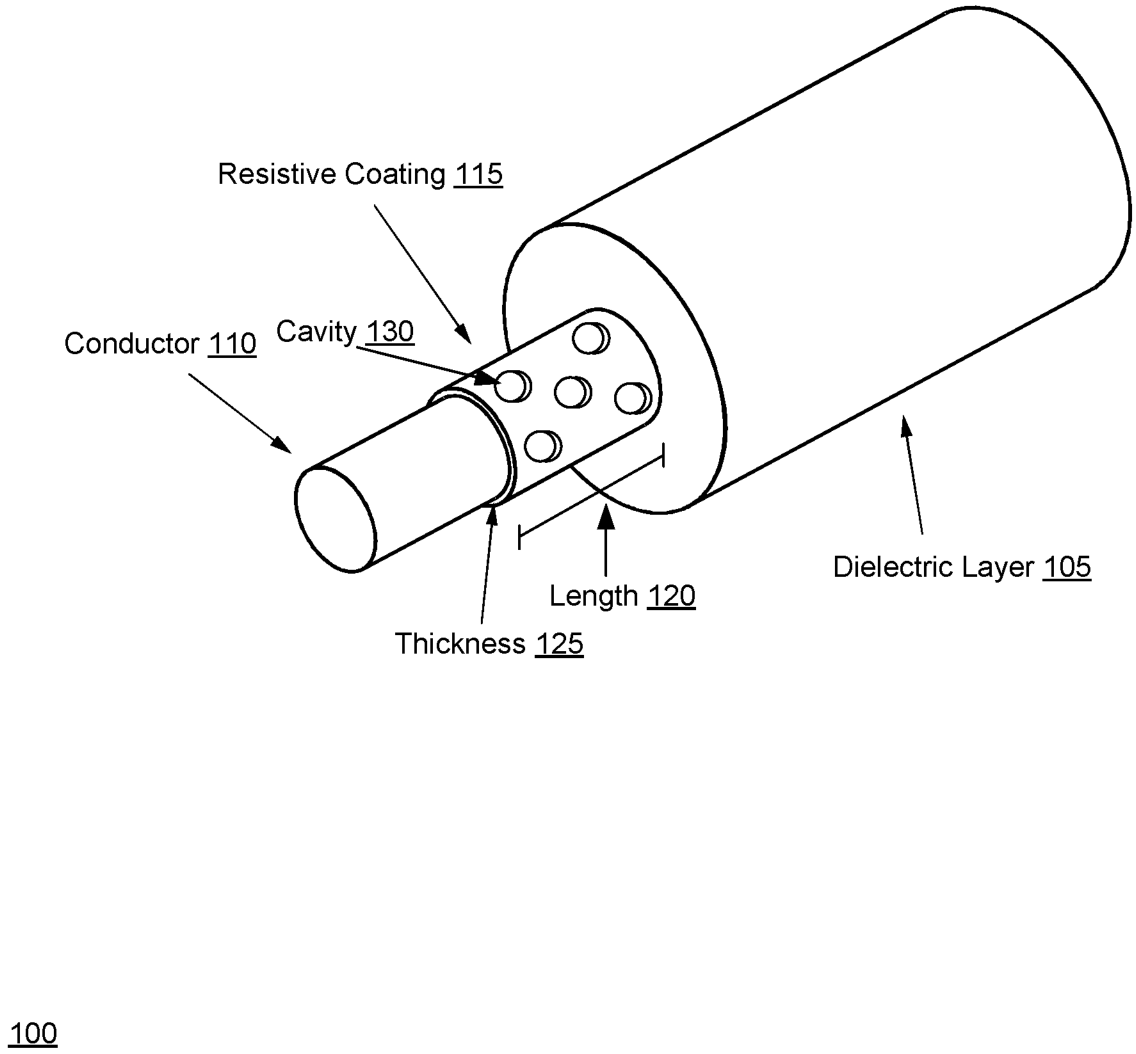

FIGS. 1A and 2 show a perspective view of a cable 100 commonly used for high-speed signal transmission, such as a coaxial cable. Cable 100 includes a dielectric layer 105, a conductor 110, and a resistive coating 115. For simplicity, drain and shield of cable 100 are not shown. Dielectric layer 105 surrounds conductor 110. Resistive coating 115 of a length 120 may and a thickness 125 may be applied to an exposed portion of conductor 110. Length 120 and thickness 125 of resistive coating 115 may vary based on various factors, such as length of cable 100, diameter of conductor 110, or the like.

In cable 100 or in particular, conductor 110 may be used for signal transmission. When an alternating current (AC) signal is applied to conductor 110, the alternating current is distributed within the conductor. Conductor 110 may be cylindrical in shape and be formed from one of any electrically conductive material. For example, conductor 110 may be implemented or formed from silver, copper, tin-plated copper, silver-plated copper, or the like. However, conductor 110 is not restricted to such materials, and may be implemented with any suitable electrically conductive material.

Dielectric layer 105 may include one of any substantially electrically insulative material. For example, dielectric layer 105 may be implemented with polyethylene or polytetrafluoroethylene. However, dielectric layer 105 is not restricted to such materials, and may be implemented with any suitable insulating material having low conductivity.

In connecting various components inside and outside an information handling system, various lengths of cables may be used. For example, typical cable length in servers can vary from approximately 150 millimeter (mm) to 750 mm or longer. As such, a configuration design of how the various components are connected in a server may need to support both a 150 mm length cable and a 750 mm length cable. However, this is difficult because the length of the cable can affect the signal attenuation. For example, shorter cables typically do not dampen reflections and crosstalk and thus encounter more failures.

Figure 3:
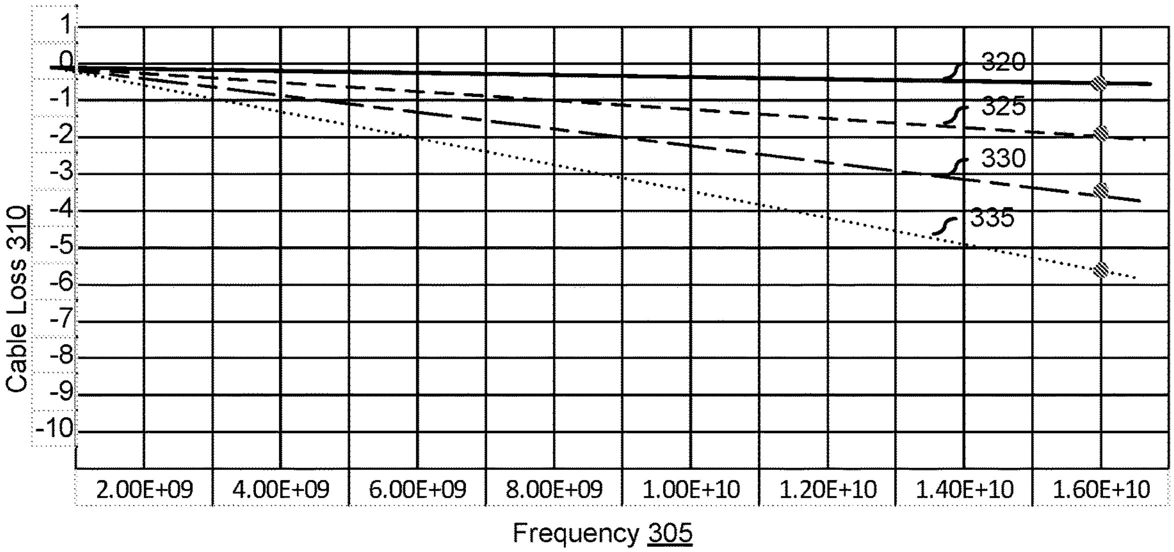
FIG. 3 illustrates a graph showing cable loss for certain cable lengths, according to an embodiment of the current disclosure.
Figure 4:
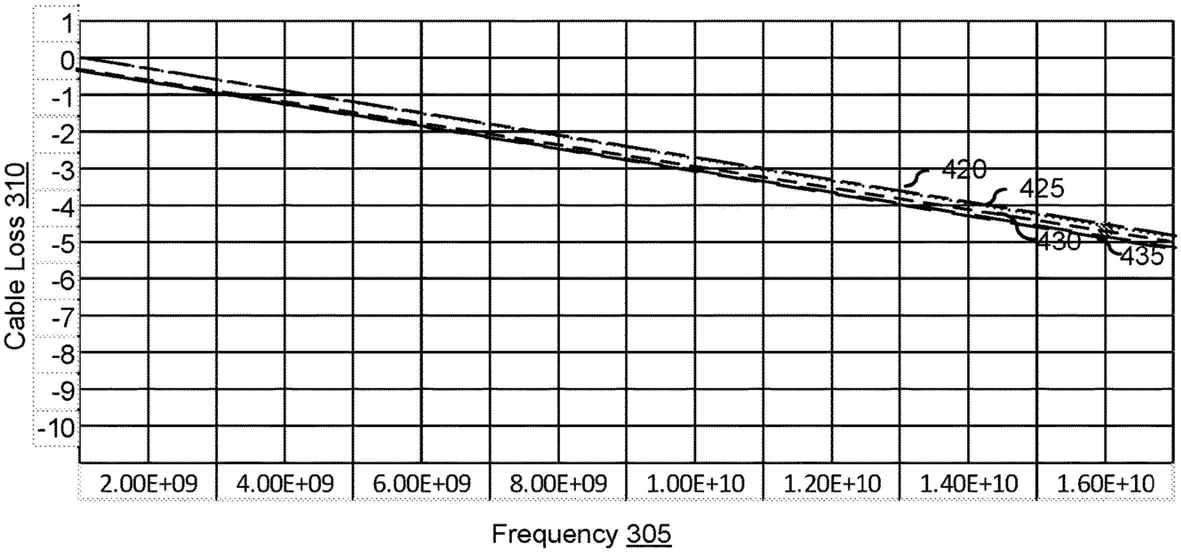
FIG. 4 illustrates a graph showing cable loss for certain cable lengths after application of a resistive coating, according to an embodiment of the current disclosure.

Currently, system design is optimized for a midrange cable length. This means that there are varying ranges of cable loss, also referred to as cable attenuation, in the system as depicted in FIG. 3. For example, signals can be stronger or weaker than designed. Although not ideal, these varying ranges of cable losses are typically accepted. Other designs, such as paddle boards have been used to address this issue. However, with new cable designs, a paddle board may not be an effective solution going forward. It would be easier and more efficient to design where the cable loss may vary but within a narrower range as depicted in FIG. 4. Accordingly, to address these and other issues, the present disclosure provides a system and method to control the attenuation of cables used in the information handling system.

The greater the length of a cable, the greater the attenuation or cable loss. In this example, longer cables typically have greater cable loss than the shorter cables. As loss of the longer cable cannot be reduced, the present disclosure provides a system and method to increase the loss of the shorter cable to mirror the loss of the longer cable. This can be accomplished by applying additional coating that can be adjusted based on a desired or target loss for that particular cable.

Here, resistive coating, such as resistive coating 115 may be applied to an exposed portion of the conductor of a shorter cable so that its resistance is increased until a target resistance is reached. The measure of the resistance value may be controlled by the thickness, type, and length of resistive coating 115. Resistive coating 115 may also be applied more than once, such that thickness 125 is increased to reach the desired resistance. The target resistance may be the resistance of the longest cable used in the system design. In an example, resistive coating 115, or resistive layer, may be a conductive paint, which in turn may enable control over how the resistive coating is applied. For example, resistive coating 115 may be applied to a certain length 120 and certain thickness 125, such as by applying more than one coat of the conductive paint. Here, assuming that cable 100 is of a shorter length than the cable length that the configuration design is optimized for, resistive coating 115 of length 120 and thickness 125 may be applied to an exposed portion of conductor 110. In an example, the application of resistive coating 115 may cause cable 100 to perform substantially similar to a longer cable, such that the cable becomes more lossy and reflections and crosstalk are dampened.

Resistive coating 115 may be applied on a portion of the surface of conductor 110 providing additional resistance to cable 100. Resistive coating 115 may be applied to a particular length and a particular thickness, such as length 120 and thickness 125 respectively. Resistive coating 115 may include a conductive pigment such as graphite, silver, copper, nickel, or carbon. The pigment may be dissolved or suspended as particles in a solution. Each of these pigments has different resistivity properties. For example, graphite may have higher electrical resistivity than nickel or copper. Thus, in addition to the length and thickness of the resistive coating, the type of conductive paint to be used may be chosen based on the target resistance.

The target resistance, also referred to as target impedance, may be calculated as $Z_0=R_{Resistive\text{-}coat}\|Z_{cable}$, wherein $Z_0$ is the target resistance, $R_{Resistive\text{-}coat}$ is the resistance of resistive coating 115 and $Z_{cable}$ is the cable impedance of cable 100 prior to the application of resistive coating 115. The cable impedance includes the impedance of both conductor 110 and dielectric layer 105. Given two resistances and/or impedances in parallel, the effective resulting impedance is the average of the two resistances and/or impedances. Given a known target resistance $Z_0$ and cable impedance $Z_{cable}$, a $R_{Resistive\text{-}coat}$ may be calculated as the delta between the target resistance and the cable impedance. In one example, if the target resistance is one hundred ohms and the cable impedance is eighty ohms, then the resistance of the resistive coating is one hundred and twenty ohms. In addition, given the target impedance, a target cable loss may be determined such as based on one or more models.

Figure 1B:
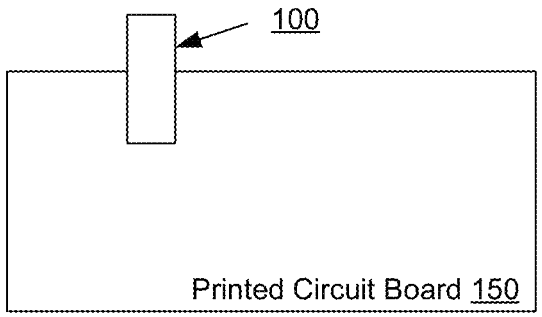

In addition, although it is shown in FIG. 1A that one end of cable 100 has been applied with resistive coating 115, both ends of cable 100 may be applied with resistive coating 115, which in turn may increase the resistance of the resistive coating. In an example, if the type of resistive coating 115 is constant, the resistance or impedance of cable 100 may increase based on one or more of the thickness, length, number of coatings and ends of the cable are increased. As the resistance or impedance increases, the cable loss increases. Based on the application of resistive coating 115, cable 100 may exhibit properties substantially equal to those of a longer cable. In addition, resistive coating 115 may also be applied to the wire and wire interface after the wire has been welded or soldered to a contact of the PCB to establish electrical contact, as depicted in FIG. 1B, wherein cable 100 may be soldered to a PCB 150. Resistive coating 115 may also be applied before ultraviolet glue is applied to the electrical contact. Thus, by applying the present disclosure, losses attributable to cables, such as cable 100, may be controlled at the manufacture level of the information handling system.

Referring to FIG. 2, portions of resistive coating 115 have been removed or blasted away to form one or more cavities in the resistive coating. In certain examples, portions of resistive coating 115 may be removed in order to adjust the resistance of resistive coating 115 to be closer to a target resistance. For example, by removing portions of resistive coating 115, the resistance value of the coating may decrease. In another example, an additional coating may be applied on top of resistive coating 115 during the adjustment. The additional coating may be applied before or after portions of resistive coating 115 have been removed to create cavities 130 in the resistive coating.

FIG. 3 shows a graph 300 showing cable loss for certain cable lengths. As a transmission signal travels through the cable, some of the energy will be dissipated in the cable which is referred to as cable loss. Several factors affect cable loss, such as cable type, material used, diameter of the cable and/or conductor, length of the cable, etc. Typically, the greater the diameter of the cable, the lower the cable loss. However, the longer the cable, the greater the cable loss. Similarly, while the relationship is not linear, the higher the frequency of the transmission signal, the greater the cable loss.

Graph 300 shows a frequency 305 in gigahertz (GHz) along the x-axis and the cable loss in decibels (dB) along the y-axis. Line 320 represents cable loss for a cable 1 with a length of 100 mm, wherein the cable loss is 0.667 dB at a frequency of 1.6e+10. Line 325 represents cable loss for a cable 2 with a length of 300 mm, wherein the cable loss is −2 dB at the frequency of 1.6e+10. Line 330 represents cable loss for a cable 3 with a length of 500 mm, wherein the cable loss is −3.33 dB at the frequency of 1.6e+10. Line 335 represents cable loss for a cable 4 with a length of 700 mm, wherein the cable loss is −4.67 dB at the frequency of 1.6e+10. It should be noted that apart from length the cables 1-4 are substantially similar. Thus, the range of cable loss at frequency of 1.6e+10 is [0.667, 4.67].

FIG. 4 shows a graph 400 showing cable loss for certain cable lengths after the application of resistive coating. The resistive coating may have different lengths and thickness based on the length of the cable. Typically, assuming the cables used in the information handling system have the same properties except for its length, the shorter the cable is, the higher the resistance of the resistive layer is needed or desired. Since the resistance of the resistive layer is used to shunt and dissipate some of the skin currents, the higher the desired resistance of the resistive layer, the longer and thinner the resistive layer may be applied to the exposed portion of the conductor. For example, cable 1 may have the longest and/or thinnest application of the resistive coating, cable 3 may have the shortest and/or thickest application of the resistive coating among cables 1-3, and cable 4 may not have any resistive coating.

Graph 400 shows a frequency 305 in GHz along the x-axis and the cable loss in dB along the y-axis. Line 420 represents cable loss for a cable 1 with a length of 100 mm, wherein the cable loss is −4.59 dB at a frequency of 1.6e+10. Line 325 represents cable loss for a cable 2 with a length of 300 mm, wherein the cable loss is −4.59 dB at the frequency of 1.6e+10. Line 330 represents cable loss for cable 3 with a length of 500 mm, wherein the cable loss is −4.59 dB at the frequency of 1.6e+10. Line 335 represents cable loss for cable 4 with a length of 700 mm, wherein the cable loss is −4.59 dB at the frequency of 1.6e+10. It should be noted that apart from length and the amount of resistive coating, cables 1-4 are substantially similar. The cable loss at frequency of 1.6e+10 of cables 1-4 is the same at −4.59 dB.

Figure 5:
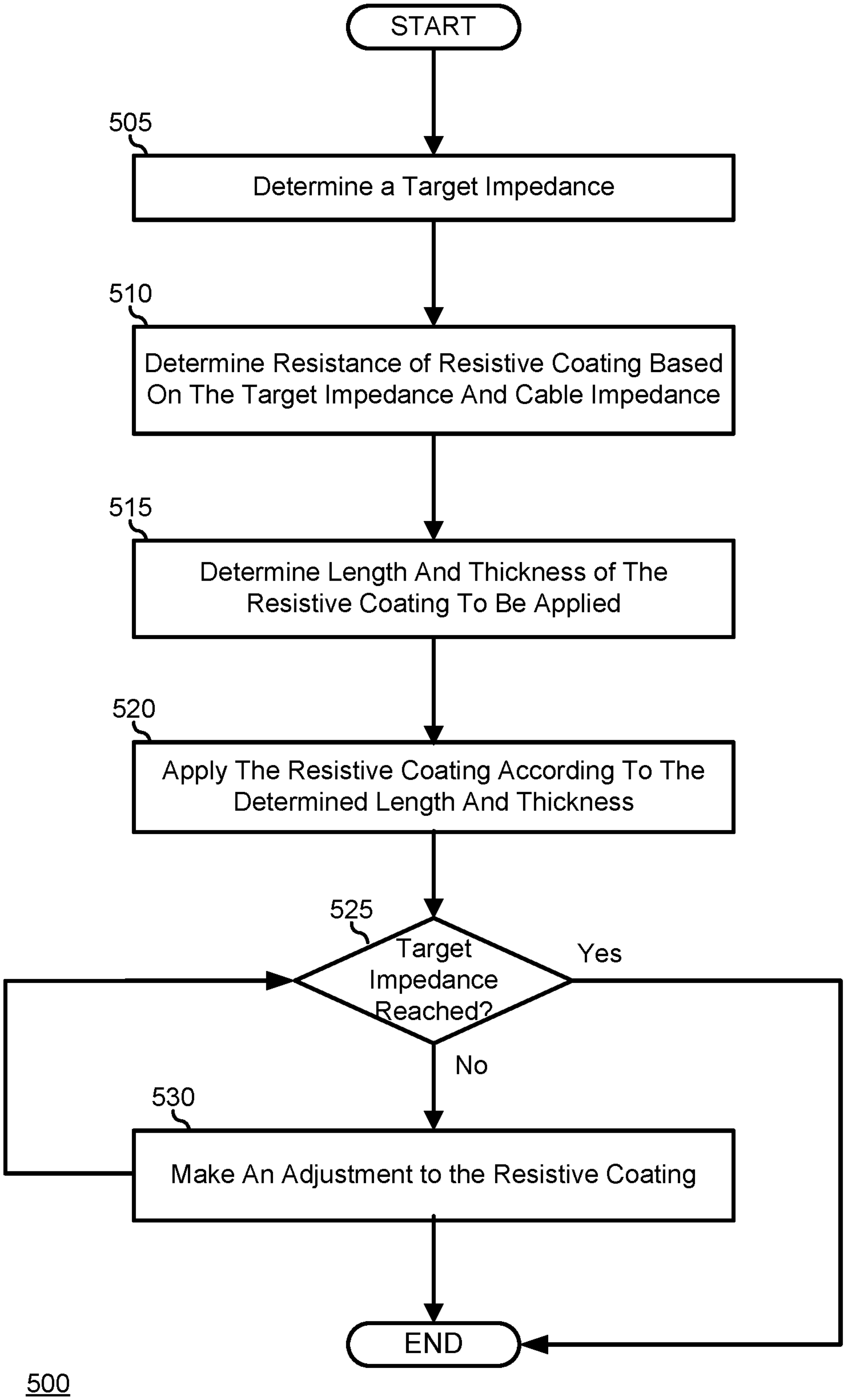
FIG. 5 is a flowchart illustrating a method for implementing controlled cable attenuation, according to an embodiment of the current disclosure.

FIG. 5 shows a flowchart of a method 500 for implementing controlled cable attenuation. Method 500 typically starts at block 505, where a target impedance is determined, which may be based on the impedance of the longest cable to be used. At block 510, a resistance value of the resistive coating may be determined based on the target impedance and the cable impedance. For example, the resistance value may be a delta between the target impedance and the cable impedance. At block 515, based on the value of the resistance determined in block 510, a length and thickness of the resistive coating is determined. For example, a model may be created and its resistance value tested to determine the length and the thickness of the resistive layer. The method proceeds to block 520, where the conductive paint is applied according to the determined length and thickness. More than one coating may be applied to reach the desired thickness. In another example, the resistance of the cable may be measured after each application of the resistive layer until the desired resistance of the cable is reached.

The method proceeds to decision block 525, where it is determined whether the target impedance is reached. For example, the cable may be tested to determine whether the cable with the resistive layer reached the target impedance, such as by measuring high frequency loss. If the target impedance is reached, then the "YES" branch is taken and the method ends. If the target impedance is not reached, then the "NO" branch is taken and the method proceeds to block 530, where an adjustment to the resistive coating is made. For example, portions of the resistive coating may be blasted away or laser trimmed to reduce the resistance until the target impedance is reached. In another example, the thickness and/or the length of the resistive coating may be increased such as by applying another coat of the conductive paint. In yet another example, another resistive coating may be applied to the other end of the cable.

Figure 6:
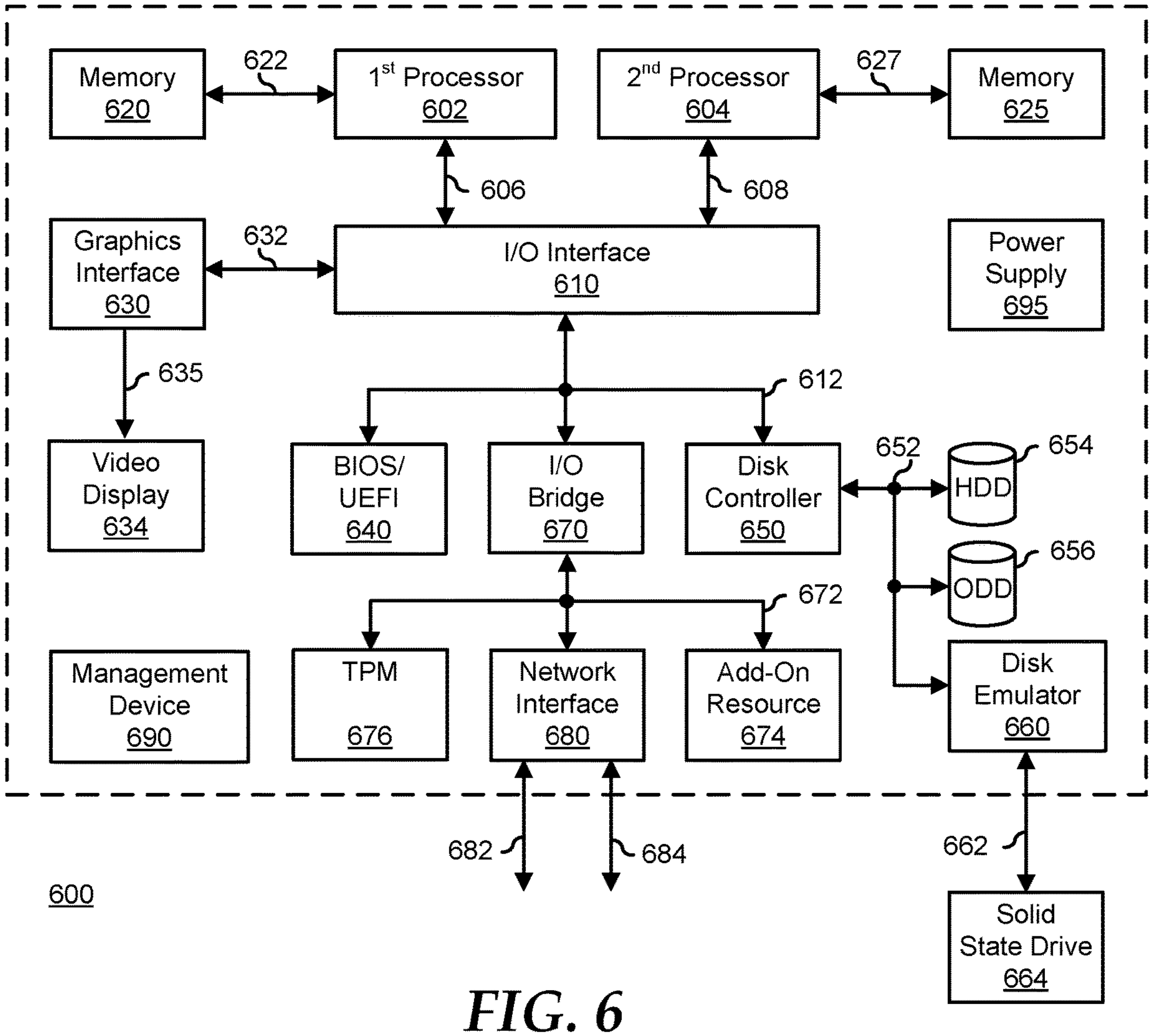
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 664, an I/O bridge 670, one or more add-on resources 674, a trusted platform module (TPM) 676, a network interface 680, a management device 690, and a power supply 695. Processors 602 and 604, I/O interface 610, memories 620 and 625, graphics interface 630, BIOS/UEFI module 640, disk controller 650, HDD 654, ODD 656, disk emulator 660, SSD 664, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 635 to a video display 634. In a particular embodiment, information handling system 600 includes separate memories that are dedicated to each of processors 602 and 604 via separate memory interfaces. An example of memories 620 and 625 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 300 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (00B) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A cable, comprising:

a conductor in a center of the cable;

a dielectric layer surrounding the conductor; and a resistive coating applied to an exposed portion of the conductor and disposed with the dielectric layer, wherein a resistance of the resistive coating when combined with an impedance of the cable prior to application of the resistive coating reaches a target impedance wherein the resistive coating is applied to the exposed portion of the conductor after the exposed portion of the conductor is soldered to a contact of a printed circuit board.

2. The cable of claim 1, wherein the resistive coating is applied to a particular length.

3. The cable of claim 1, wherein the resistive coating is applied to a particular thickness.

4. The cable of claim 1, wherein a portion of the resistive coating is removed to adjust the resistance of the resistive coating.

5. The cable of claim 1, wherein the cable further includes a second resistive coating applied to a second exposed portion of the conductor.

6. The cable of claim 1, wherein the resistive coating is applied before an ultraviolet glue is applied.

7. The cable of claim 1, wherein the impedance of the cable includes a first impedance of the conductor and a second impedance of the dielectric layer.

8. An information handling system, comprising:

a printed circuit board; and a cable to be soldered to the printed circuit board, the cable including:

a conductor;

a dielectric layer surrounding the conductor;

a first resistive layer surrounding a first exposed portion of the conductor and disposed with the dielectric layer, wherein the first resistive layer is applied to the first exposed portion of the conductor and a resistance of the first resistive layer when combined with an impedance of the cable prior to application of the first resistive layer reaches a target impedance; and a second resistive layer applied to a second exposed portion of the conductor.

9. The information handling system of claim 8, wherein the first resistive layer is applied to a particular length.

10. The information handling system of claim 8, wherein the first resistive layer is applied to a particular thickness.

11. The information handling system of claim 8, wherein a portion of the first resistive layer is removed to adjust the resistance of the first resistive layer.

12. The information handling system of claim 8, wherein the second resistive layer is applied before an ultraviolet glue is applied.

13. The information handling system of claim 8, wherein the second resistive layer is applied to the second exposed portion of the conductor after the first exposed portion of the conductor is soldered to a contact of the printed circuit board.

14. The information handling system of claim 8, wherein the impedance of the cable includes a first impedance of the conductor and a second impedance of the dielectric layer.

15. A method, comprising:

determining an impedance of a cable;

determining a target impedance for the cable; and based on the impedance of the cable and the target impedance, applying a first resistive coating to a first exposed portion of a center conductor of a first end of the cable, wherein the first resistive coating is applied to the first exposed portion of the center conductor after the first exposed portion of the center conductor is soldered to a contact of a printed circuit board.

16. The method of claim 15, wherein the applying of the first resistive coating is performed to a particular length.

17. The method of claim 15, wherein the applying of the first resistive coating is performed to a particular thickness.

18. The method of claim 15, further comprising adjusting resistance of the first resistive coating by removing portions of the first resistive coating.

19. The method of claim 15, wherein the first resistive coating is applied to the first exposed portion of the center conductor before an ultraviolet glue is applied.

20. The method of claim 15, further comprising applying a second resistive coating of a second length to a second exposed portion of the center conductor at a second end of the cable.

* * * * *